Figure 3:
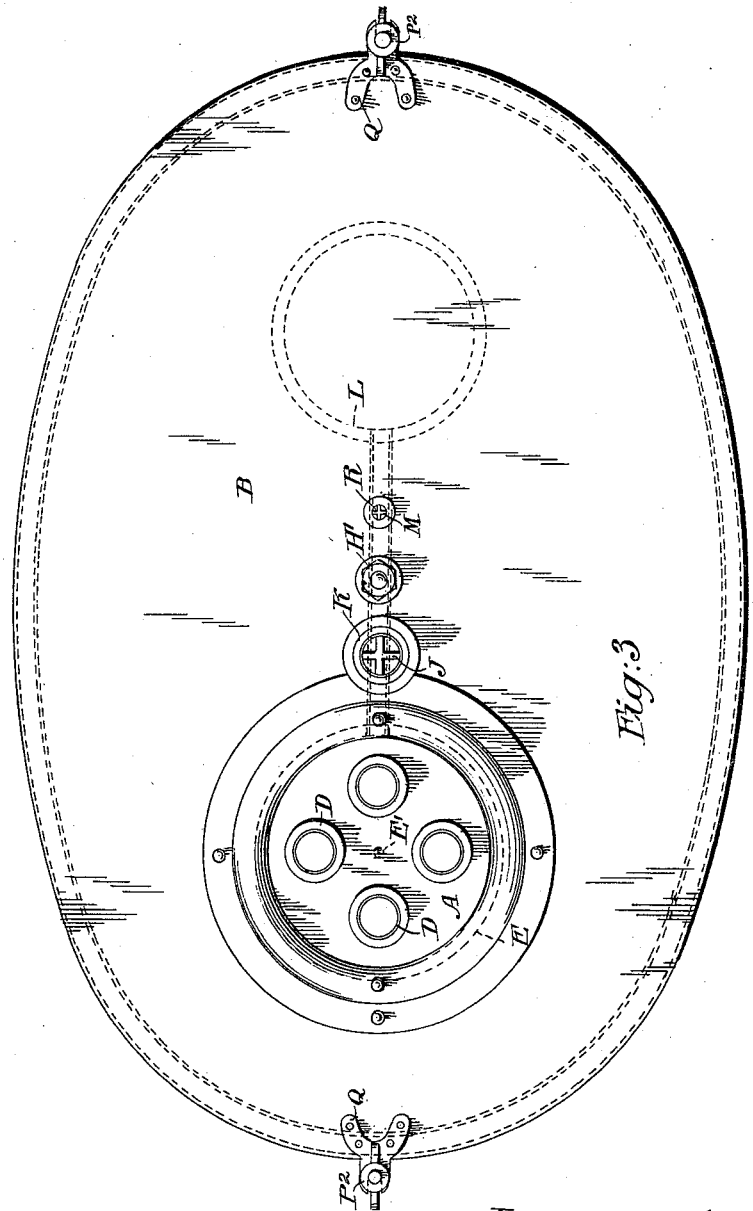

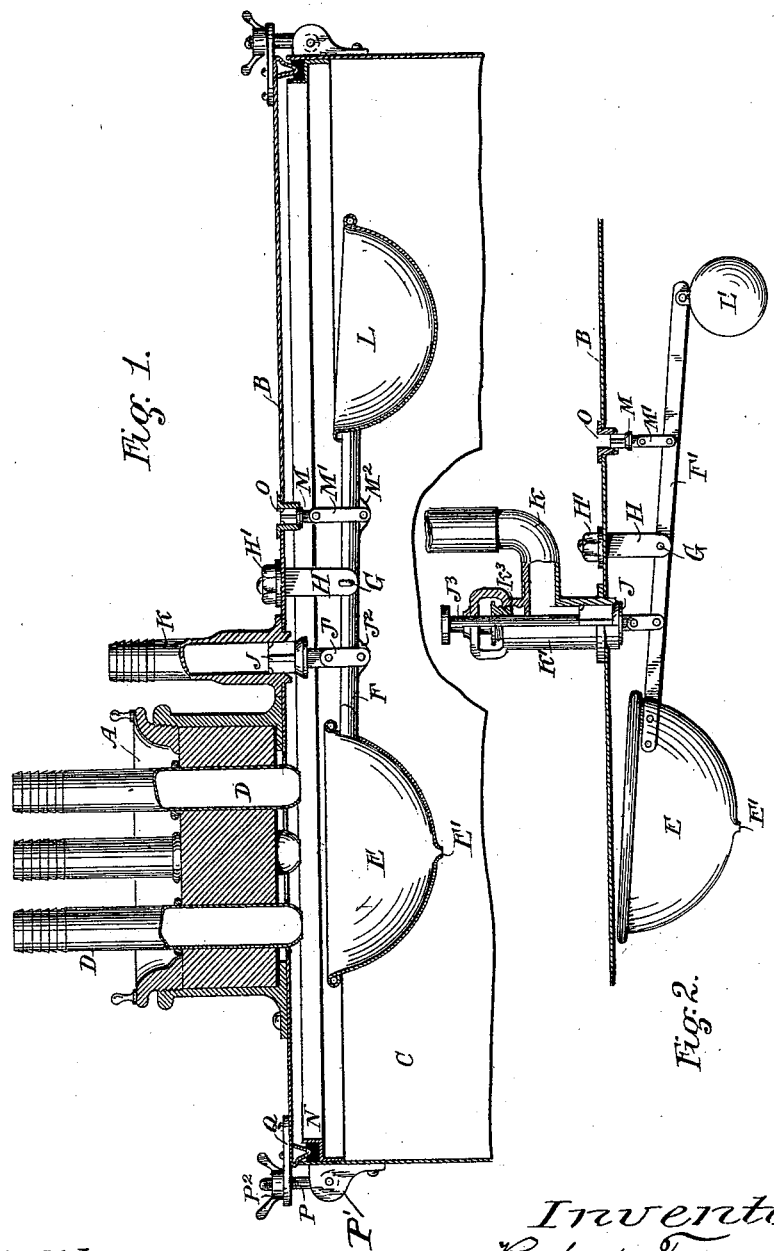

(No Model.) 2 Sheets—Sheet 2.

R. FERGUSON & A. T. DANKS.
MILKING MACHINE.

No. 518,234. Patented Apr. 17, 1894.

Witnesses:
E. B. Bolton
M. B. Barker

Inventors:
Robert Ferguson
Aaron Turner Danks
By Richards
their Attorney

United States Patent Office.

ROBERT FERGUSON AND AARON TURNER DANKS, OF MELBOURNE, VICTORIA.

MILKING-MACHINE.

SPECIFICATION forming part of Letters Patent No. 518,234, dated April 17, 1894.

Application filed November 10, 1893. Serial No. 490,542. (No model.)

*To all whom it may concern:*

Be it known that we, ROBERT FERGUSON, engineer, and AARON TURNER DANKS, merchant, citizens of Melbourne, subjects of the Queen of Great Britain, and residents of Bourke Street, Melbourne, in the Colony of Victoria, have invented a certain new and useful Improvement in Milking-Machines whereby the Vacuum is Automatically Cut Off from the Teat-Tubes, of which the following is a specification.

This invention relates to improvements in milking machines whereby the vacuum and consequent suction in the tubes leading to the teats of the cow being milked is automatically broken or cut off immediately the supply of milk ceases thus preventing any injury to the animal from useless sucking.

A cup or open vessel is connected to one end of a pivoted lever of tubular form while the other end supports a similar but smaller cup said lever forming a channel between the two cups. When the milk is flowing into the receiving cup the greater portion will flow by the channel lever into the smaller cup and thence over its edge into the main can, while a small amount will pass through a small aperture provided in the bottom of the receiving cup, and as the milk gradually ceases to flow the amount passing through the small aperture will gradually reduce the weight in the larger cup below the weight of the milk in the smaller cup so allowing the small cup arm of the lever to fall and actuate an inlet air valve supported by said arm while the other arm of the lever rises and actuates a valve to close the vacuum or suction pipe.

An alternative form of our invention consists in applying a weight to one end of the lever in place of the smaller cup. In this case the weight of the receiving cup as the milk decreases in it is overcome by the weight thus actuating the valves in the manner described.

Referring now to the drawings—Figure 1 shows a sectional view of the apparatus attached to the lid of the suction can of the machine. Fig. 2 is a sectional view of an alternative form of same. Fig. 3 is a plan of Fig. 1.

In the drawings "A" represents a casing set on the lid "B" of the can "C."

"D" are metal tubes having their ends provided with annular grooves to form a hold for the usual india-rubber tubes, which lead to the teats of the cow.

A cup "E" is supported below the tubes "D" by a lever "F" constructed in the form of a channel or open pipe. This cup is provided with a small aperture "E'" preferably about one-sixteenth of an inch in diameter. The lever "F" is centered on a removable pin "G" within the bifurcated end of rod "H" depending from the lid of the can and secured by a nut "H'." The opposite end of the lever supports a cup "L" similar to the receiving cup, but smaller and without the aperture. This arm of the lever supports and actuates a valve "M" to open or close an air passage "O" into the can, this valve is connected by links "M" to a lug "M²" formed on the bottom of the channel lever "F." The opposite arm of the lever supports and actuates a valve "J" to cut off or open a passage to the vacuum pipe "K." This valve is connected by links "J'" to a lug "J²" on the channel lever similarly to the valve "M."

As it is necessary to maintain a vacuum in the can while the milking is in progress the junction of the lid with can is made air-tight. A small channel is formed round the edge of the can by a bent plate "N" and soft india-rubber is placed within this channel. The edge of the lid is turned downwardly in a V form and this edge is held rigidly against the soft india-rubber within the channel by bolts "P" secured to brackets "P'" attached to the side of the can, these bolts pass within the bifurcated ends of plates "Q" secured to the cover "B," the cover is held in position by nuts "P²" screwed on to the bolts and an air-tight joint is thus formed. It may be convenient to provide a can with two or more sets of the apparatus herein described so that the milk from a number of cows may be led into one can and in this case it is necessary to have a separate vacuum chamber for each set, and for this purpose a partition or partitions may be arranged within the can, the junction of such partitions with the lid of the can being made air-tight by a similar channel to that described for the edge of the can, and a similar V edge formed on the lid to engage with the channel.

The alternative form of our invention (see Fig. 2) consists in employing a weight "L'" at one end of the lever in place of the small cup, the lever in this case being formed of a rod or bar "F'" and actuates valves similar to and for the purpose of those already described but in this case a rod "J³" is set within a casing "K'" above the valve "J" and operates to lower the said valve and reverse the lever so as to close the air passage "O" on starting the machine. A packing box "K²" is also provided to prevent the inlet of air to casing "K'"

The *modus operandi* of our invention is as follows: The cups "E" and "L" being empty their position will be as indicated on Fig. 1 of the drawings the air-passage being closed and the passage through the tube "K" (which is connected to an ejector or other vacuum producer) being open. Suction is caused in the pipe "K," can "C" and teat tubes "D" so as to draw milk which flows by the tubes "D" into the cup "E" whence it will flow by the channel lever "F" into the small cup "L" and thence into the main can. A small portion passing through the aperture "E'" the weight of the large receiving cup while thus full of milk will counterbalance the weight of the smaller cup at the other end of lever and will thus keep same in its raised position and valve "M" closed against its seat so as to maintain the vacuum in the can, but as the milk gradually ceases the flow through the aperture "E'" will gradually overcome the flow along the channel to the small cup, until the weight of milk in the cup "E" is overcome by that of the cup "L" thus causing the lever to reverse its position and the valve "J" to close the vacuum passage and open the air-passage "O" respectively, thus preventing any further suction through the teat tube.

In the operation of the alternative form of our invention (see Fig. 2) the valve rod "J³" is pressed so as to lower the valve "J" and open the vacuum passage and close the air-passage "O," the milk flowing into the cup "E" and over its edge will maintain the valves in these positions and the rod may then be released from its pressure on the valve seat "J" thus allowing same to rise and close the vacuum passage when lever becomes reversed as the weight "L'" gradually overcomes the weight of milk in the cup "E."

Having now particularly described and ascertained the nature of our said invention and in what manner the same is to be performed, we declare that what we claim is—

1. In combination, in a milking apparatus, the receptacle having an air port, the liquid connection to the receptacle, the suction pipe, the suction valve, the air valve, the movable support connected to the valves, the cup connected to said movable support to control the said valves, said cup being arranged to receive the inflowing liquid, substantially as described.

2. In combination, in a milking apparatus, the receptacle having the air port, the suction pipe, the suction and air valves and the cup connected thereto and arranged to be weighted by the inflowing liquid, said cup having a perforation E' for the escape of liquid, substantially as described.

3. In combination, in a milking machine, the receptacle having an air port, the inlet pipe for the liquid, the suction pipe, the suction and air-valves, the weighted lever carrying the valves and the cup to receive the liquid flowing into the receptacle, said cup acting in opposition to the weighted end of the lever, substantially as described.

4. In combination in a milking machine, the receptacle having the air port, the suction pipe, the cup E adapted to receive the liquid from the suction pipe to be weighted down thereby, the balanced channel lever carrying said cup, the cup L at the other end of said lever adapted to receive the liquid through the channel lever from the main cup E' and the valve mechanism comprising the suction and air valves connected with the lever to be controlled thereby, substantially as described.

Signed this 30th day of August, 1893.

ROBT. FERGUSON.
AARON TURNER DANKS.

Witnesses:
A. O. SACHSE,
 C. E., *Melbourne.*
A. HARKER,
 *Clerk, Melbourne.*